(12) United States Patent
McCarthy

(10) Patent No.: US 7,674,119 B1
(45) Date of Patent: Mar. 9, 2010

(54) RETRACTABLE RECEPTACLE FOR FURNITURE

(76) Inventor: David G. McCarthy, 59 Applewood Dr., Huntington, CT (US) 06484

( * ) Notice: Subject to any disclaimer, the term of this patent is extended or adjusted under 35 U.S.C. 154(b) by 724 days.

(21) Appl. No.: 08/951,276

(22) Filed: Oct. 16, 1997

(51) Int. Cl.
*H01R 13/44* (2006.01)
(52) U.S. Cl. .................................... 439/131
(58) Field of Classification Search ............... 439/131, 439/544, 576; 174/48, 57
See application file for complete search history.

(56) References Cited

U.S. PATENT DOCUMENTS

| | | | |
|---|---|---|---|
| 3,433,886 A * | 3/1969 | Myers | 174/57 |
| 3,646,244 A * | 2/1972 | Cole | 174/57 |
| 4,372,629 A * | 2/1983 | Propst et al. | 312/223 |
| 4,511,198 A * | 4/1985 | Mitchell et al. | 439/131 |
| 4,551,577 A * | 11/1985 | Byrne | 439/131 |
| 4,747,788 A * | 5/1988 | Byrne | 439/131 |
| 5,231,562 A | 7/1993 | Pierce et al. | 439/131 |
| 5,351,173 A * | 9/1994 | Byrne | 439/131 |
| 5,888,078 A * | 3/1999 | Lecreux et al. | 439/131 |

* cited by examiner

*Primary Examiner*—Briggitte R Hammond
(74) *Attorney, Agent, or Firm*—Mark P. Stone

(57) ABSTRACT

A receptacle for coupling electrical equipment and communications equipment to electrical and communications transmission lines is retractably mounted in an opening in a furniture unit, and in particular, the top surface of an office conference table. The receptacle is vertically displaceable so that it is elevated above the top surface of the furniture unit in which it is mounted to provide access for coupling electrical equipment such as lap top computers, or communications equipment such as telephones and fax machines, which are supported on the top surface of the furniture unit. When the equipment is coupled to the elevated receptacle unit, the unit is then displaced downwardly into the furniture such that the top surface of the receptacle unit is planar with the top surface of the furniture unit in its fully retracted position. A gap defined between the outer surface of the top surface of the receptacle unit and the inner surface of the opening in the furniture unit permits wires and cables to extend through the gap and remain connected to the receptacle unit when the receptacle unit is in its fully retracted position in the furniture unit. The receptacle unit may be displaced into its elevated position to disconnect lines coupled to it or to connect additional lines. In this manner, portable electrical and communications equipment can be supported or stored on furniture units, such as conference tables, and actuated when needed by coupling the equipment to the receptacle in the furniture unit.

3 Claims, 2 Drawing Sheets

RETRACTABLE RECEPTACLE FOR FURNITURE

BACKGROUND OF THE INVENTION

The present invention is directed to a furniture system, and in particular an office furniture system, including means for readily and conveniently coupling portable electrical, electronic and communications equipment to appropriate electrical and communications lines. The portable equipment adapted to be used in conjunction with the system of the present invention includes computers, facsimile machines, telephones, and lighting equipment, among other things.

U.S. Pat. No. 5,231,562, entitled "Desk Top Wire Management Apparatus" exemplifies a known receptacle device installed in an opening on a desktop for coupling plugs of different equipment to be used on the desk, such as calculators, computers, and telephones. The apparatus disclosed by this patent includes a housing mounted within an opening in the top surface of a furniture unit, as for example in a desk top, and a cover pivotably mounted to the top of the housing. The underside of the cover includes a plurality of individual electrical receptacles which are exposed when the cover is pivoted into its opened position and extends upwardly in a substantial perpendicular orientation relative to the desktop surface. In this extended position, plugs from the portable equipment on the desk top are coupled to the individual receptacles on the underside of the cover. The receptacles in the cover are themselves coupled to a source of electrical power for energizing the equipment plugged into the cover. The housing mounted in the opening in the desktop also includes a pivotable wall for providing access to outlet assemblies or wiring modules contained within the housing. Since the housing is mounted beneath the top surface of the desk, access to the outlet assemblies or wiring modules within the housing is only available through the pivoted wall beneath the desktop surface.

The device disclosed by U.S. Pat. No. 5,231,562 is complicated in that: it requires a housing have both a pivotable top cover and a pivotable wall; access to the interior of the housing is only available through the underside of the desktop to which the unit is mounted; and the pivotable cover, in its opened position, does not provide equal access to the individual electrical receptacles at different locations along the desktop surface. It is the primary object of the present invention to provide a furniture system having retractable receptacle means overcoming the disadvantages of the known systems as that exemplified by U.S. Pat. No. 5,231,562.

SUMMARY OF THE INVENTION

A furniture system includes a receptacle unit displacably mounted within an opening defined in the top surface of the furniture unit. The receptacle unit includes individual receptacles to selectively receiving electrical plugs and other connectors for coupling portable electronic, electrical and communications equipment supported on the top surface of the furniture unit. Such equipment includes, but is not limited to, computers, calculators, telephones, facsimile machines, electronic screens, and lighting fixtures. The receptacle unit is selectively displaceable between an elevated position in which the individual receptacles are elevated above the top surface of the furniture unit to provide ready access for coupling and uncoupling plugs and other connectors to the individual receptacles, and a fully retracted position in which the top surface of the receptacle unit is substantially planar with the top of the furniture unit to provide a substantially continuous top surface. A slight gap or space is defined between the outer perimeter of the top surface of the receptacle unit and the inner perimeter of the opening in the top surface of the furniture unit to permit electrical cords or other wires to extend through the gap. In this manner, electrical wires or other connectors coupled to the receptacle unit in its elevated position are received in and extend through the gap when the receptacle unit is displaced into its retracted position in the opening in the furniture unit.

In the preferred embodiments of the invention, a brush extends across the gap between the receptacle unit in its retracted position and the top surface of the furniture unit to prevent small materials or objects on the top surface of the furniture unit from falling into the gap space. The receptacle unit is generally symmetrical in configuration so as to provide equal access from different locations along the top surface of the furniture unit. If the furniture unit is a square or rectangular conference table, the receptacle unit is preferably square or rectangular in shape to provide individual receptacles facing all four sides of the table for providing ready access from any location around the table. A housing for receiving the receptacle unit in its retracted position is fixedly mounted, to the underside of the surface of the furniture unit, and the housing has an opened top which is aligned with the opening defined in the top surface of the furniture unit. The housing includes an opening therein for receiving one or more cords or lines for coupling the receptacle unit to an external source of electrical power or to external communication lines. Preferably, the receptacle unit is spring biased in a direction urging it into its extended elevated position, and releasable locking means are provided for selectively retaining the receptacle unit in its fully retracted position in the opening in the top surface of the furniture unit.

DESCRIPTION OF THE BEST MODES FOR CARRYING OUT THE INVENTION

Figure 1:
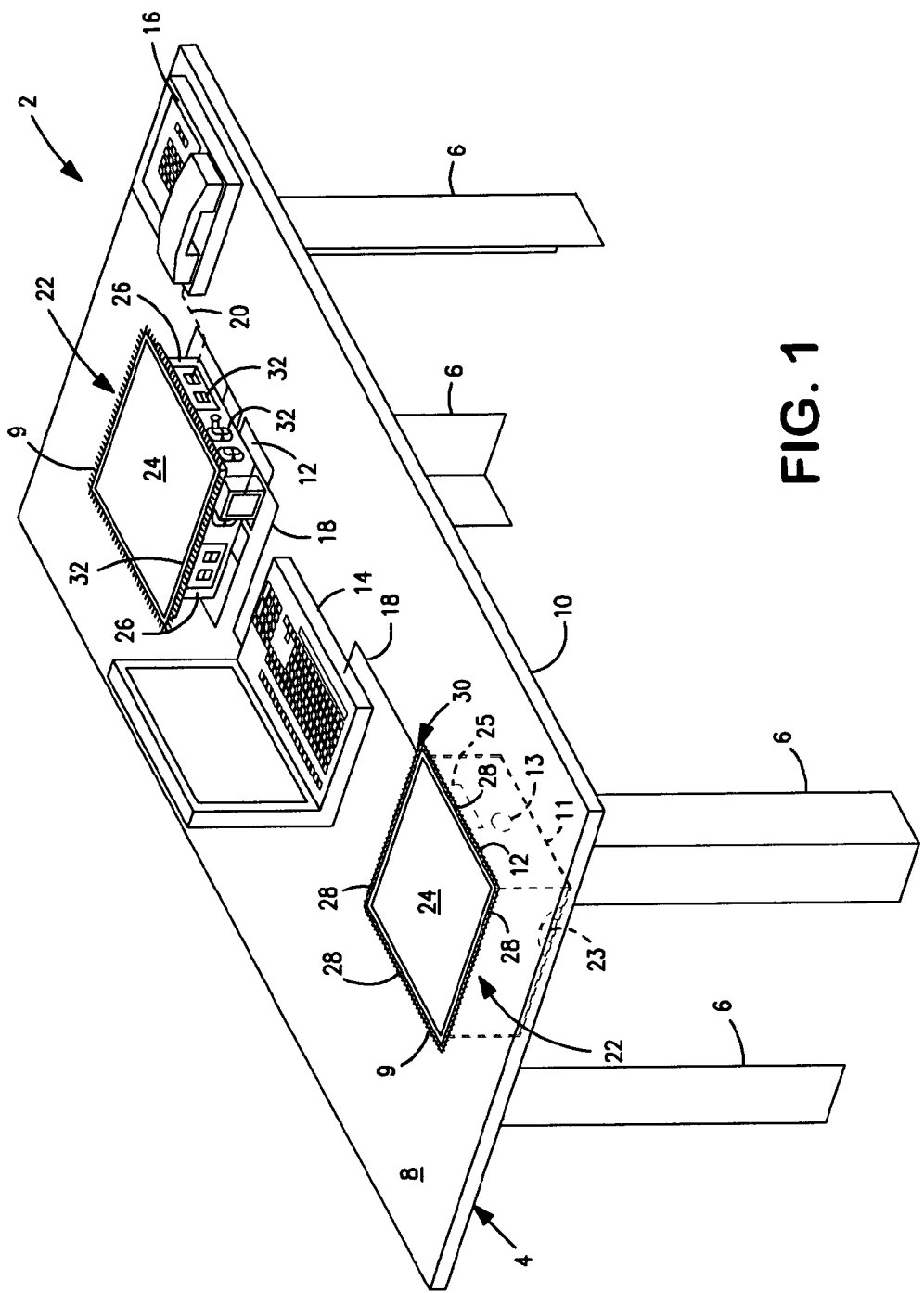
FIG. 1 is a perspective view of a first embodiment of a furniture system in accordance with the present invention.
Figure 2:
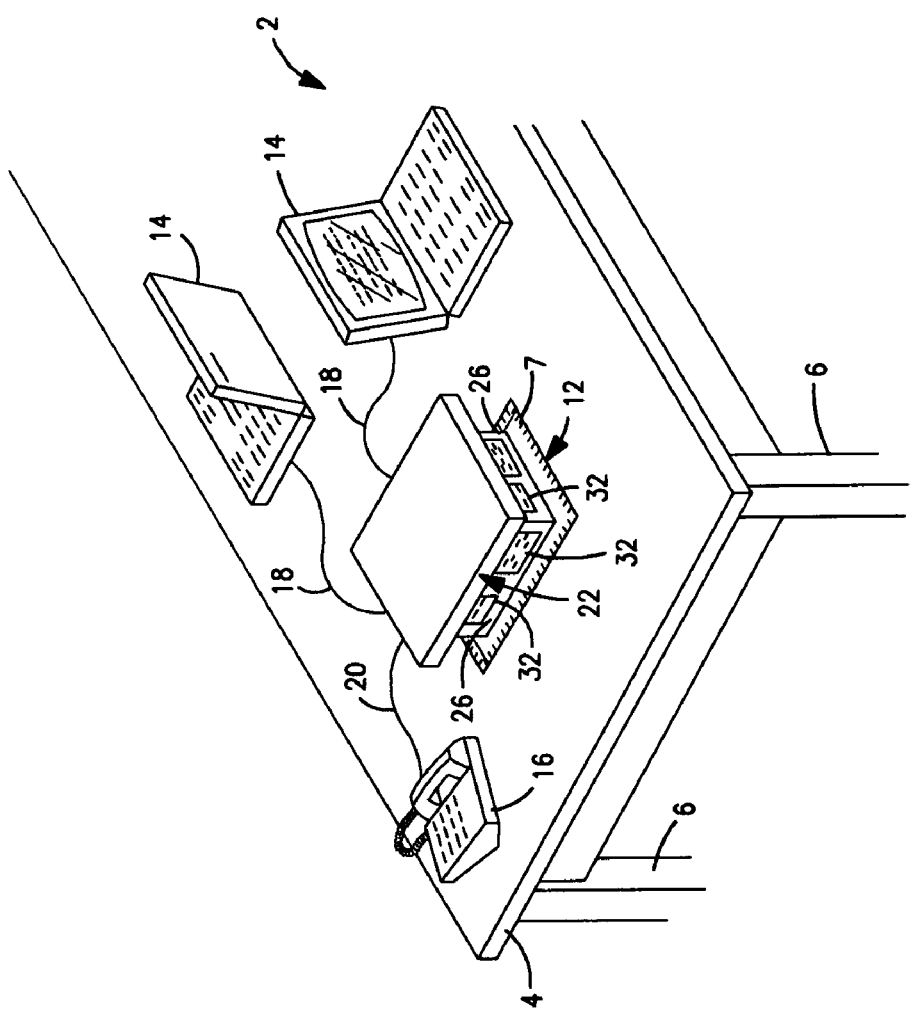
FIG. 2 is a perspective view of a second embodiment of a furniture system in accordance with the present invention.

FIGS. 1 and 2 illustrate the preferred embodiments of the improved furniture system in accordance with the present invention.

A furniture unit designated generally by the reference numeral 2 represents a conference table having a generally rectangular shape table top 4 supported by four corner legs 6. The table top 4 defines an upper surface generally designated by the reference numeral 8, and an undersurface generally designated by the reference numeral 10. Two generally square shaped openings, each designated by the reference numeral 12, are defined in the top surface 8 of the table 2. A computer, designated by reference numeral 14, and a telephone, designated by reference numeral 16, are supported on the top surface of the table. A power line for the computer 14 is generally designated by reference numeral 18, and a cord for the telephone 16 is generally designated by reference numeral 20.

A receptacle unit generally designated by reference numeral 22 is shown in its extended position, vertically displaced and elevated above the top surface 8 of the table 2. The receptacle unit 22 includes a top surface 24 which is formed from the same material as the top surface 8 of the table, and four sidewalls 26, each defining a plurality of individual receptacles 32 for receiving electrical plugs from electrical equipment on the tabletop, or for receiving connectors from other equipment on the tabletop, as for example, communications lines, fiber optic transmission lines, and other lines for transmitting signals or data.

FIG. 1 also illustrates a second receptacle unit 22, positioned at the opposed side of the table 2 (illustrated to the left in the drawing figure). In its fully retracted position in the opening 12 defined in the top surface 8 of the table, the top 24 of the retracted receptacle unit 22 is substantially co-planar with the top surface 8 of the table to provide a continuous surface. A gap or space 28 is defined between the outer surface of the receptacle unit top 24 and the inner surface of the opening 12 in which the receptacle unit is received in its fully retracted position. In this manner, a cord or line 18, coupling the computer 14 with a receptacle 32 in the retracted receptacle unit 22, extends through the gap 28 (as shown at the location designated by reference numeral 30) when the receptacle unit 22 is in its fully retracted position. Preferably, a brush or other screenlike material extends over the square shaped gap space 28 to prevent small articles from falling into the gap space when the receptacle unit 22 is in its fully retracted position. The brush or screen may be mounted to the inner surface of the opening 12 in the table top 8 (as shown by reference numeral 7 in FIG. 2) or may be mounted to the outer periphery of the top 24 of the receptacle unit 22 (as shown by reference numeral 9 in FIG. 1).

Still referring to FIG. 1, the sidewalls 26 of the receptacle unit 22 are recessed inwardly from the respective sides of the top surface 24. In this manner, clearance is provided for the plug portions of electrical cords or other transmission lines received in the individual receptacles 32 on the sidewalls 26 so that the plugs do not obstruct downward displacement of the receptacle unit 22 when it is moved into its retracted position within the opening 12 in the table top 8. As noted above, the gap space 28 defined between the table top 8 and the top surface 24 when the receptacle unit 22 is in its fully retracted position, is of sufficient width to accommodate an electrical or transmission cord or line 18. The top surface 24 of each receptacle unit 22 is of substantially the same configuration and dimension as the opening 12 in the table top 8, and is formed from the same material as the table top 8, so that a substantially smooth, planar, continuous table top surface is provided when the receptacle unit is in its fully retracted position.

A housing 11 fixedly mounted to the underside 10 table top 4 has an opened top surface corresponding to the dimensions and configuration of the top surface 24 of each receptacle 22. The housing also has a depth which is substantially equal to the elevational height of each receptacle 22 so as to completely receive the receptacle unit 22 in the housing when the receptacle is in its fully retracted position. The housing includes an opening 13 therein for providing access for transmission lines for coupling the receptacle 22 (and the individual receptacles 32 therein) to external power sources including electrical power lines and communication transmission lines. The housing protects the receptacle unit 22 when it is displaced into its fully retracted position. The receptacle unit 22 and the housing mounted to the underside of the table also include conventional means 23 for resiliently biasing the receptacle unit into its extended elevated position, and releasable locking means 25 for selectively retaining the receptacle unit in its fully retracted position. Accordingly, when the receptacle unit is in its fully elevated position, a downward force opposing the upward resilient bias is applied to displace the receptacle unit in a downward direction towards the top surface 8 of the table. When the receptacle is displaced into its fully retracted position in which its top surface 24 is level with the top surface 8 of the table, the locking means are actuated to releasably lock the receptacle in its retracted position. The locking means are selectively releasable (as for example, applying and releasing a downward force on the top 24 of the receptacle unit 22), to permit the resilient bias to displace the receptacle unit 22 into its fully elevated extended position. Resilient biasing means and cooperating releasable locking means are well known to the art, and any such conventional means may be employed in the present invention.

FIG. 2 illustrates a second embodiment in accordance with the present invention. The same reference numerals have been used in FIG. 2 to designate common elements illustrated in FIG. 1. FIG. 2 illustrates a table 2 having a single receptacle unit 22 received in a single opening 12 defined in the top surface 8 of the table top 4. The receptacle unit 22 is illustrated in its extended elevated position, and two computers 14 and one telephone 16 are coupled respectively by lines 18 and 20 into individual receptacles 32 defined in sidewalls 26 of the receptacle unit 22. While the configuration of the receptacle units 22 illustrated in FIG. 1 are square, the receptacle unit 22 illustrated in FIG. 2 is generally rectangular in shape.

The four sides 26 of the receptacle units 22 illustrated in both FIGS. 1 and 2 correspond to the four sides of the table 2 illustrated in FIGS. 1 and 2. In this manner, the sides 26 carrying the individual receptacles 32 face towards all four sides of the table 2, thereby providing convenient access to the individual receptacles 32 from each of the four sides of the table 2. As discussed with respect to the embodiment of the invention illustrated in FIG. 1, the embodiment illustrated by FIG. 2 also includes a housing (not shown) fixedly mounted beneath the underside 10 of the table top 4, and cooperating releasable locking means and resilient biasing means for selectively and releasably locking the receptacle unit into its fully retracted position received in the opening 12 in the table top 4. In the fully retracted position of the receptacle unit 22, the top surface 24 thereof is planar with the top surface 8 of the table 2 and is formed from the same material as the table top to provide a substantially continuous top surface.

As also discussed with respect to FIG. 1, the FIG. 2 embodiment defines a gap space around the outer surface of the top 24 of the receptacle unit 22 when the receptacle unit is in its fully retracted position so that wires or cords connected to the individual receptacles 32 are passed through the gap space. A screen or brush material 7 can be provided over the gap space between the top 24 of the receptacle unit 22 in its retracted position and the inner surface of the opening 12 in the table top 8 to prevent small objects (for example papers clips or pens and pencils) from falling through the gap space.

In operation, the receptacle unit 22 is moved into its extended elevated position, in which the individual receptacles 32 are exposed and completely accessible to persons seated around the table 2. Portable equipment, as for example, computers, telephones, fax machines, calculators and the like, are coupled to the individual receptacles 32. The receptacle unit 22 is then displaced downwardly so that the top surface 24 thereof is flush with the top surface 8 of the table 2. The wires connecting the equipment coupled to the receptacle unit 22 are received in and extend through the gap space defined between the outer surface of the top 24 of the receptacle unit and the inner surface of the opening 12 in the table top when the receptacle unit is displaced into a fully retracted position. Accordingly, substantially the entire surface of the table top 8 is available for use once the receptacle 22 has been displaced into its fully retracted position. When it is desired to either uncouple equipment from the receptacle unit 22, or to couple additional equipment to the receptacle unit 22, the receptacle unit is displaced into its elevated position by releasing the locking means retaining it in its retracted position. Once the appropriate connection or disconnection has been made, the receptacle unit is again displaced into its fully retracted position to provide a continuous table top surface.

The furniture system in accordance with the present invention is advantageous in many respects over the known system. The system described herein is simple from a mechanical perspective in that it employs only a relatively small number of movable mechanical parts. Essentially, the receptacle unit 22 is selectively displaceable, as a whole, between a fully retracted position and a fully elevated position, thereby eliminating the need to provide pivotably mounted walls or top covers. In the preferred embodiment of the invention, individual receptacles are provided on all sidewalls of the receptacle unit in its elevated position, thereby providing convenient access to the individual receptacles from different locations relative to the furniture unit in which the receptacle 22 is installed. The recessed orientation of the sidewalls (and thus the individual receptacles of the receptacle unit) relative to the periphery of the top surface of the receptacle unit provides protection for the plugs and other connector elements received in the individual receptacles carried on the sidewalls of the receptacle unit as it is displaced between its extended and retracted position.

Other advantages and modifications within the scope of the present invention will be apparent to those skilled in the art. Accordingly, the preferred embodiments of the invention discussed herein are intended to be illustrative only and not restrictive of the scope of the invention, that scope being defined by the following claims and all equivalents thereto.

The invention claimed is:

1. An article of furniture having a top surface and an opening defined in said top surface; a receptacle unit mounted in said opening in said top surface; said receptacle unit comprising a top and at least one sidewall extending downwardly from said top, said at least one sidewall having at least one receptacle defined therein; means for selectively displacing said receptacle unit between a retracted position in which said top of said receptacle unit is planar with said top surface of said article of furniture, and an extended position in which said at least one receptacle in said at least one sidewall of said receptacle unit is elevated above the top surface of said article of furniture, said housing having an open top and being aligned with said opening defined in said top surface of said article of furniture so as to receive said receptacle unit in said housing when said receptacle unit is in said retracted position, said article of furniture further including means for resiliently biasing said receptacle unit into said extended position, and cooperating releasable locking means for opposing said means for resiliently biasing for retaining said receptacle unit in said retracted position.

2. The article of furniture as claimed in claim 1 wherein said housing includes means for coupling said receptacle unit to an external power source.

3. An article of furniture having a top surface and an opening defined in said top surface; the improvement comprising a receptacle unit adapted to be mounted in said opening in said top surface of said article of furniture; said receptacle unit comprising a top and at least one sidewall extending downwardly from said top, said at least one sidewall having at least one receptacle defined therein; and means for selectively displacing said receptacle unit between a retracted position in which said top of said receptacle unit is planar with said top surface of said article of furniture, and an extended position in which said at least one receptacle in said at least one sidewall of said receptacle unit is elevated above the top surface of said article of furniture, said improvement further including means for resiliently biasing said receptable unit into said extended position, and cooperating releasable locking means for opposing said means for resiliently biasing for retaining said receptacle unit in said retracted position.

* * * * *

UNITED STATES PATENT AND TRADEMARK OFFICE
CERTIFICATE OF CORRECTION

PATENT NO. : 7,674,119 B1  Page 1 of 1
APPLICATION NO. : 08/951276
DATED : March 9, 2010
INVENTOR(S) : David G. McCarthy It is certified that error appears in the above-identified patent and that said Letters Patent is hereby corrected as shown below:

Column 6, Line 7 (Claim 1, Line 12); After "furniture,": add --and a housing mounted to an underside of said top surface of said article of furniture,--.

Signed and Sealed this

Eighteenth Day of May, 2010

David J. Kappos
*Director of the United States Patent and Trademark Office*